July 9, 1946.   L. M. POTTS   2,403,680
CIPHERING SYSTEM
Filed Oct. 19, 1942   2 Sheets-Sheet 1
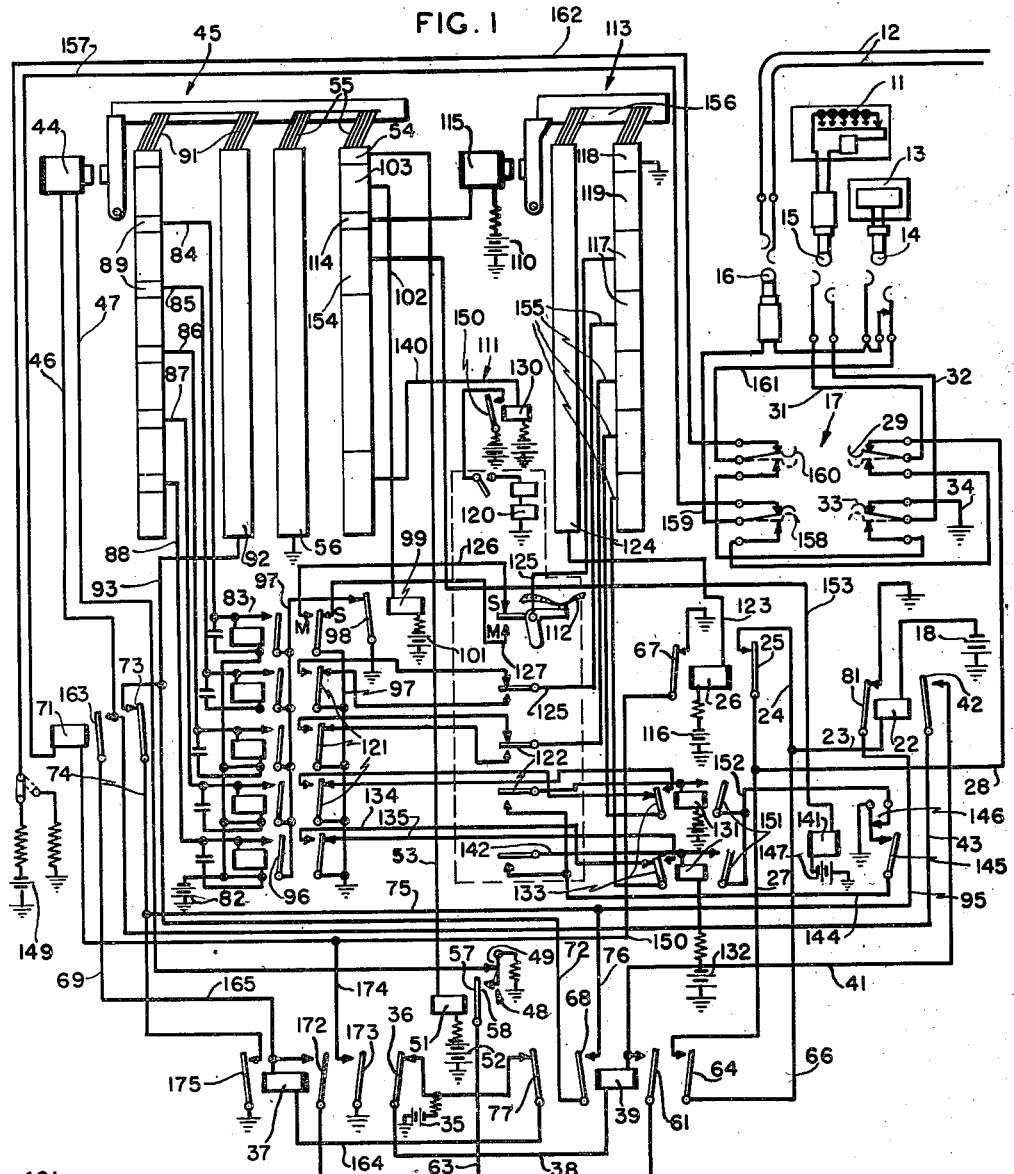
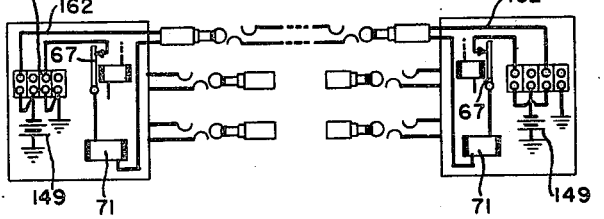
INVENTOR
LOUIS M. POTTS
BY *J. H. B. Whitfield*
ATTORNEY July 9, 1946.  L. M. POTTS  2,403,680
CIPHERING SYSTEM
Filed Oct. 19, 1942  2 Sheets-Sheet 2
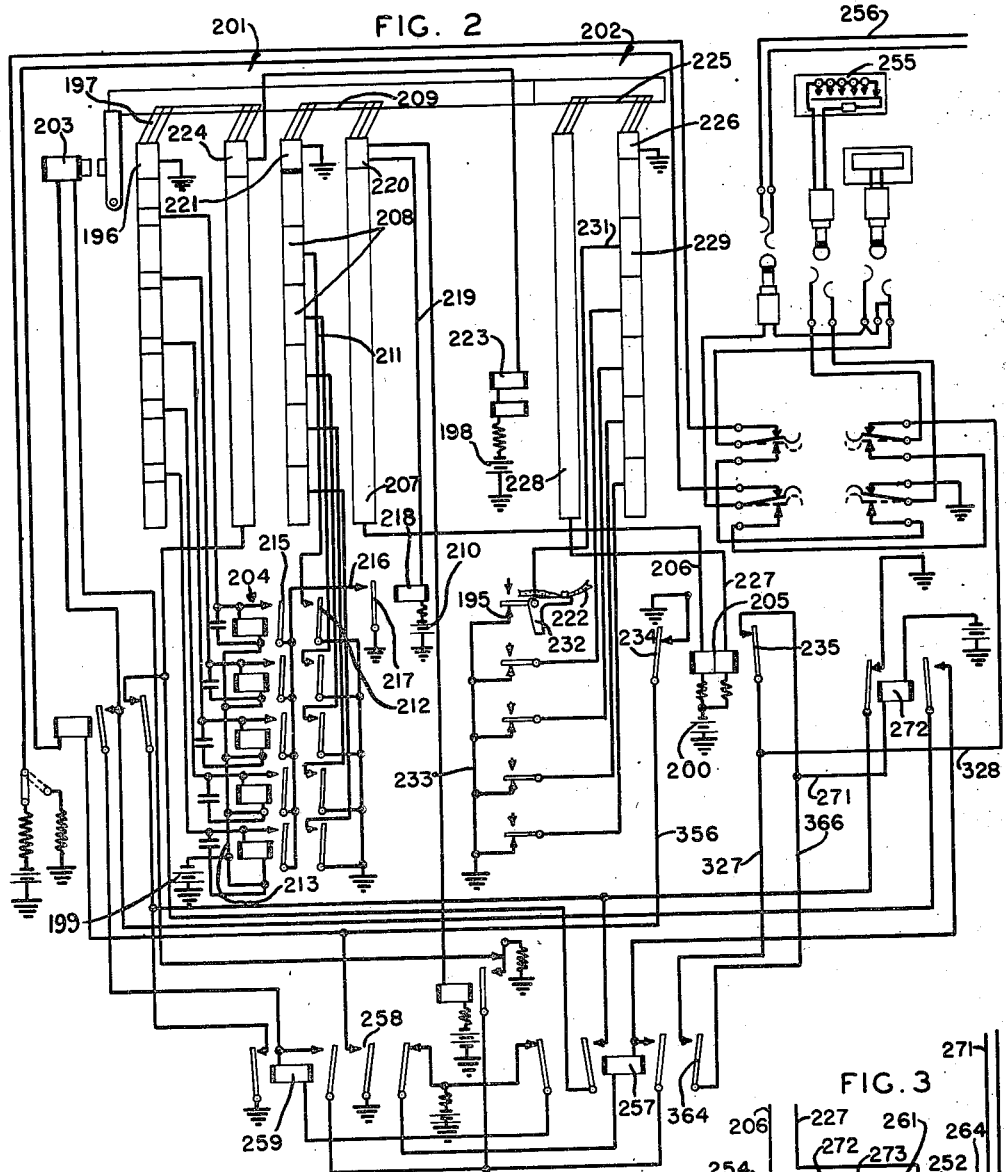
FIG. 2
FIG. 3
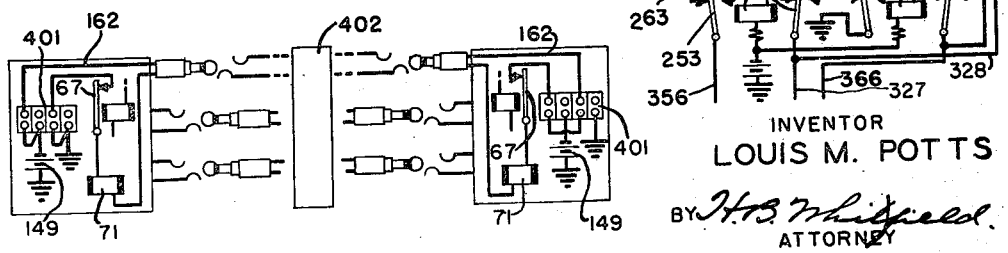
FIG. 5
INVENTOR
LOUIS M. POTTS
BY *H. B. Whitfield*
ATTORNEY Patented July 9, 1946

2,403,680

UNITED STATES PATENT OFFICE 2,403,680

CIPHERING SYSTEM

Louis M. Potts, Evanston, Ill., assignor to Teletype Corporation, Chicago, Ill., a corporation of Delaware Application October 19, 1942, Serial No. 462,523

18 Claims. (Cl. 178—22)

This invention pertains to printing telegraph systems and particularly to a system for the transmission and reception of secret telegraph messages.

Secret signaling systems are desirable for naval, military and civil purposes wherein it is required that messages be rendered uninterceptable by persons unauthorized to receive them. The surreptitious interception of messages may be accomplished, for example, in the case of wire communication by tapping signal wires and in radio communication by means of receiving apparatuses tuned to the proper frequencies.

The primary object of the present invention is the provision of a reliable and practical telegraph circuit arrangement for rendering messages unintelligible to unauthorized persons.

Another object of the present invention is the provision of a ciphering system for telegraph messages including an electrical circuit system which is automatically conditioned either to encipher or decipher signals according to the direction of transmission.

A further object of the invention is to provide a portable self-contained enciphering and deciphering unit that is easily and readily attachable and detachable to standard telegraph printing apparatus having transmitting and receiving facilities.

In one form, the invention utilizes a receiving distributor by means of which a set of five receiving relays are conditioned upon the receipt of enciphered or deciphered signals and a key tape transmitter for providing key signals. The key signals are combined with the signals provided by the receiving relay and produce resultant signals which are transmitted by means of a transmitter-distributor to a transmitting relay having a pair of associated transmitting contacts, only one of which is effective for transmission at a time dependent on the direction of transmission.

A second form of the invention features the use of a double wound relay for enciphering and deciphering messages. One winding of the relay is under the control of key signals and the other winding is under the control of either enciphered or original signals dependent upon the direction of transmission. In this instance, two distributors are provided, one for key signals and the other for either the original or enciphered signals.

A third form of the invention closely resembles the second form except that two separate relays are employed for transmitting purposes instead of a double wound relay.

In order to encipher messages by the present system the elements of the original code combinations are combined with the elements of code combinations provided by a key tape. In this arrangement, opposite conditions, that is, with one element of the original code combination marking and with the corresponding element of the key code combination spacing, produce a marking signal. Like conditions, however, that is, with both elements marking or both elements spacing, produce spacing signals. This presumes, of course, that each of the elements of the respective code combinations are related to each other. That is, the No. 1 element of the original code combination is combined with the No. 1 element of the key code combination, and so forth. To take a specific illustration, let it be assumed that it is desired to encipher the letter "R" which in the Baudot code is composed consecutively of spacing, marking, spacing, marking, and spacing conditions. Let it be further assumed that the key tape with which the particular enciphering operation is to be performed occupies a position whereat it is conditioned for producing the letter "Y" combination which in the Baudot code is composed consecutively of marking, spacing, marking, spacing, and marking conditions. Under the assumed conditions, the enciphering operation would result in the production of an all marking or "letters" combination since in this particular illustration opposite conditions of all the elements of "R" and "Y" code combinations are provided. This will be readily apparent from the following chart wherein the letter "M" indicates a marking condition and the letter "S" indicates a spacing condition.

|  | 1 | 2 | 3 | 4 | 5 |
|---|---|---|---|---|---|
| Original signal "R" | S | M | S | M | S |
| Key signal "Y" | M | S | M | S | M |
| Enciphered signal "letters" | M | M | M | M | M |

It is understood that both the transmitting and receiving end of a telegraph line will be equipped with idential key tapes, which during message transmission will occupy identical positions. The key tapes are advanced during transmission to continuously modify the key signal, but both tapes occupy the same corresponding position at all times. A station which receives enciphered signals is thus enabled to decipher the unintelligible signals transmitted over the telegraph line by combining enciphered signals with key signals provided by its key tape. To illustrate a deciphering operation, the example given above in connection with the enciphering operation will be continued and it will be assumed that a receiving station received the enciphered signal; namely, "letters." The "Y" combination provided by the key tape at the receiving station can now be combined with the "letters" combination to decipher the enciphered signals to thereby reproduce the original signal "R" as clearly shown in the following chart:

|  | 1 | 2 | 3 | 4 | 5 |
|---|---|---|---|---|---|
| Enciphered signal "letters" | M | M | M | M | M |
| Key signal "Y" | M | S | M | S | M |
| Original signal "R" | S | M | S | M | S |

The invention may be more readily understood from the following detailed description and the drawings wherein, Fig. 1 is a circuit diagram of the main embodiment of the invention;

Fig. 2 is a circuit diagram of a second form of the invention;

Fig. 3 is a circuit diagram of a third form of the invention; and

Figs. 4 and 5 are schematic views showing methods of interconnecting communicating stations.

Referring now to Fig. 1, the first form of the invention will be described in detail. In order to facilitate the description of the first embodiment of the invention, it will be assumed that a local station comprising unit 11 desires to communicate with an outlying station over a loop circuit indicated at 12. In order to make a local record and check the operation of enciphered signals, a check printer 13 is provided which, by means of the plug and jack arrangement shown at 14, may be readily plugged into the loop circuit. Similar plug and jack connections for the station unit 11 and the loop 12 are shown respectively at 15 and 16. The apparatus is provided with a manually-operable switch shown generally at 17, by means of which the local station unit 11 may be conditioned to transmit and receive either regular telegraph messages or enciphered messages. When it is desired to transmit or receive enciphered messages, switch 17 is operated to its upper or coding position, and conversely, when it is desired to transmit or receive regular telegraph messages, switch 17 is positioned to its lower position.

The circuit for the local station unit 11 may be traced as follows: From battery 18 through the winding of receiving relay 22, over conductors 23 and 24, through contact tongue 25 of transmitting relay 26, over conductors 27 and 28, through tongue 29 of switch 17, over conductor 31, through the station 11, back over the conductor 32, through tongue 33 of switch 17, and over conductor 34 to ground.

When local station unit 11 commences to transmit, the just-described circuit is interrupted and relay 22 is de-energized due to the transmission of the start or no current signal. When this occurs, the following circuit is established: From battery 35, over tongue 36 of direction relay 37, over conductor 38, through the winding of direction relay 39, over conductor 41, through contact tongue 42 of receiving relay 22 (now de-energized), over conductor 43, over conductor 46, through the winding of start magnet 44 associated with receiving distributor 45, over conductor 47, and through contact 49 of make-before-break contact 48 to ground. The operation of start magnet 44 releases distributor 45 for the reception of a signal code combination from station unit 11 at this time, and the distributor is brought to rest upon the impression of the stop or marking impulse upon magnet 44, which follows after every five-unit code combination. In the rest position of the distributor 45, a circuit is made for relay 51 which may be traced as follows: From battery 52, through the winding of relay 51, over conductor 53, through segment 54 of the distributor, over the brushes 55, and through conducting ring 56 to ground. As brush 55 moves off segment 54, the circuit for relay 51 is broken, whereupon armature 57 is released to open contact 49 to break the energizing circuit of start magnet 44, and moreover, direction relay 39 becomes locked up over the following circuit: From battery 35, through contact tongue 36 of direction relay 37, over conductor 38, through the winding of direction relay 39 (now energized), through its associated contact tongue 61, over conductors 62 and 63, through contact tongue 57 of relay 51 (now de-energized) and through contact 58 of the make-before-break contact 48 to ground.

With direction relay 39 thus energized, its contact tongue 64 is held attracted so that transmitting contact 25 of transmitting relay 26 is shunted out of circuit over conductors 27 and 66 inasmuch as at this time it is desired to transmit from station 11 to the remote station over the transmitting contact 67. This prevents the operation of contact 25 from interfering with the operation of the circuit under the first assumed condition with station 11 transmitting. At this time, the direction relay 39 also holds its associated tongue 68 in its attracted position so that contact tongue 73 associated with relay 71 is shunted out of circuit and rendered ineffective, in view of the fact that it is necessary at this time that outgoing signals which are transmitted through the relay 71 do not interfere with the operation of the circuit. This shunting circuit is as follows: From contact tongue 68, over conductor 72, through contact tongue 73 (if it should be attracted by its associated receiving relay 71) over conductor 74, over conductor 75, and over conductor 76 back to the contact tongue 68.

The operation of direction relay 39 further results in the attraction of its contact tongue 77 to deprive direction relay 37 of battery so that the local station unit 11 may assume complete control of the circuit, and therefore signals from a remote station at this time will be ineffectual to seize control of the circuit. After every revolution of the distributor 45, brushes 55 return to their rest position whereat the previously described circuit is made to the relay 51 which by its operation attracts its tongue 57 to break the locking circuit to relay 39 to return the circuit to normal in preparation for subsequent operations.

As the original signals are received from station unit 11 by the local relay 22, contact tongue 81 is operable to make and break the following circuit, according to whether marking or spacing impulses are being transmitted: From battery 82 through the windings of the receiving relays 83 (receiving marking signals), over conductors 84 to 88, dependent upon the code combination being transmitted, through associated segments 89, over brushes 91, over the solid conducting ring 92, over conductors 93 and 72, through contact tongue 68 (now attracted) of direction relay 39, over conductors 76 and 95 and through the contact tongue 81 of local receiving relay 22 (when marking signals are being received and receiving relay 22 is accordingly energized) to ground.

When a particular receiving relay 83 becomes energized over the just-described circuit, it is locked up as follows: From battery 82, through the winding of a particular relay 83, over its contact tongue 96, over conductor 97, and through contact 98 of locking relay 99 to ground. Prior to the reception of each signal code combination, locking relay 99 is momentarily energized to break previous locking circuits, which may have been completed over the following circuit: From battery 101, through the winding of locking relay 99, over conductor 102, through segment 103 of the distributor 45, over the brushes 55, and through the solid conducting ring 56 to ground.

In order to effect the enciphering of out-going messages and the deciphering of incoming messages, there is provided in the ciphering system of the present invention, a key tape transmitter indicated generally at 111 which utilizes a key tape 112. It will be understood, of course, that each station will be provided with identical key tapes which occupy identical positions during communicating operations. The only prerequisite is that at any particular instant or communicating operation, the key tapes at the interconnected stations be identical, because the key tapes may be different at different times or operating periods. Enciphered or deciphered signals dependent upon the direction of transmission, are delivered to the transmitting relay 26 through the instrumentality of a transmitting distributor 113.

Shortly after the operation of the receiving distributor 45, segment 114 thereof is traversed by the brush 55 and a circuit is completed to the start magnet 115 of the transmitting distributor 113 from ground, through solid conducting ring 56, over brushes 55, through segment 114, through the winding of start magnet 115, and through battery 110 to ground, to place transmitting distributor 113 in operation. It is, therefore, observable that the transmitting distributor 113 lags behind receiving distributor 45, the purpose of which is to provide an overlap arrangement to secure the proper margin of operating time for the ciphering operation, to insure that the receiving relays 83 and the key tape 112 are properly conditioned for operation at the required time interval.

As the receiving relays 83 respond to signals, associated tongues or armatures 121 are either attracted or not, depending upon whether a marking or a spacing signal is impressed on storing relays 83. The circuit for the upper three receiving relays 83 is so designed with respect to the upper three tape feelers 122 of key tape 112 that a marking signal will be produced when the tongues 121 of the relays 83 are conditioned to a position opposite to that of the corresponding tape feelers 122. On the other hand, when a particular contact tongue 121 moves to a position similar to the position assumed by its associated tape feeler 122, the circuit is conditioned to produce a spacing signal; therefore, when contact tongue 121 and tape feelers 122 are both marking or both spacing, a spacing signal will be sent. The circuits for making signals may be traced as follows: From battery 116, through the winding of transmitting relay 26, over conductor 123, through the solid conducting ring 124 of the transmitter distributor 113, through brushes 156 and segments 117, over a particular conductor 155 conditioned for operation through a tape feeler contact tongue 122, over either the conductor 126 or 127, and through a contact tongue 121 to ground.

In order to provide for the previously mentioned overlap condition, the lower two receiving relays 83 will cooperate by means of their tongues 121 with the lower two tape feeler contact tongues 122 in a slightly different manner. When either of the lower two tape feeler contact tongues 122 move to their lower, or marking position, upon the sensing of a perforation in the key tape, a circuit is completed upon the operation of overlap control relay 141. Only the operation of the lowermost overlap relay 131 will be described. The circuit is as follows: From battery 132, through the winding of relay 131, over conductor 142, through feeler contact 122, over conductor 144, through contact tongue 145 of overlap control relay 141 (when operated) to ground. When contact tongue 145 is attracted by overlap control relay 141, as will be later explained, make-before-break contact 146 will be operated to break a previous locking circuit for either of the overlap relays 131 if they have been previously energized in a preceding signal code combination. This locking circuit extends from battery 132, through the winding of relay 131, over contact tongue 151, conductor 152, and through make-before-break contact 146 to ground. It is thus apparent that if in the immediately preceding signal combination lower tape feelers 122 were in their spacing positions their associated overlap relays 131 would not have been operated, and consequently, although tongue 145 will operate, it will not unlock any circuit inasmuch as there was no circuit previously prepared for the relays 131. The operation of tongue 145 also performs the function of providing ground over conductor 144, through the windings of relay 131 if they are prepared by a marking condition of feelers 122 for a marking operation in the next position of key tape 112.

Overlap control relay 141 is momentarily energized at each cycle of operation of distributor 45 prior to the transmission of the signal code combination over the following circuit: From battery 147, through the winding of relay 141, over conductor 153, through the contact segment 154 of distributor 45, over conductor ring 56, to ground. In accordance with the combined positions of tongues 133 of overlap relays 131 and the tongues 121 of the lower two receiving relays 83, ground may be furnished when marking conditions occur over either conductor 134 or 135, through the contact tongue 133, over conductor 155, through brush 156, over the solid conducting ring 124 and over conductor 123, through the winding of transmitting relay 26 to battery 116.

During each revolution of distributor 45, stepping magnet 120 is operated to step the key tape to a new position as stepping control relay 130 is momentarily energized over the following circuit: From battery, through the winding of relay 130, over conductor 140, through brushes 55 and over the solid conducting ring 56 to ground. Relay 130 attracts and then releases its tongue 150 to control an obvious stepping circuit to stepping magnet 120. Due to the overlap feature which has been described, the stepping magnet is operated while the fourth and fifth signals are being transmitted since overlap relays 131 are locked up and retain the fourth and fifth elements of the signal code of the previous code combination when these elements are conditioned for marking impulses by the key tape 112. When spacing signals are provided in the fourth and fifth elements of a key code combination by the key tape, tongues 133 of the overlap relays 131 will remain unattracted in spacing position.

As relay 26 is affected by the enciphered signals, its contact tongue 67 is opened and closed according to the signals that are being transmitted to the remote station. The signals transmitted, are, of course, start-stop code signals. The key signals (that is, the signals controlled by the key tape) are provided only for the code impulses and not for the start and stop impulses, the latter impulses being invariable and are supplied independently of the key tape by the distributor segments 118 and 119 of the distributor 113. Since the normal stop condition of the line is marking, the stop impulse impressed on the line is controlled by the energized relay 26, whose circuit under this condition extends from battery 116, through the winding of relay 26, over conductor 123, over solid ring 124, over brushes 156, and through stop segment 118 to ground. Then upon initiation of transmission, when start magnet 115 is energized and brushes 156 are caused to traverse the segments, the traversal of brushes 156 over the start segment 119 will produce a no current condition on the line, since no battery is connected to the start segment 119. Hence, the circuit previously traced for relay 26 will be broken, and relay 26 will become de-energized to release its armatures 67 and 25 to transmit start impulses, either to the line 12 or to the local unit 11, depending upon the short circuit condition of said contacts 67 and 25, as previously described. This causes the opening and closing of loop circuit 12 to operate a printer at the remote station. This circuit is traceable as follows: From ground, through transmitting tongue 67, over conductor 150, through the winding of relay 71, over conductor 157, through the lower switch tongue 158 of switch 17, over conductor 159, through the plug and jack connection 16, through the outgoing part of the loop to the remote station, back through the plug connection 16, through the plug connection 14 of the check printer 13, over conductor 161, through switch tongue 160 of switch 17, and over conductor 162 to battery 149. The enciphered signals which will be printed by the check printer 13 are also transmitted over the outgoing loop circuit 12 to the remote station either directly or through a central telegraph office or exchange. The system having now been described with respect to transmission of outgoing enciphered signals, a description will now be given wherein enciphered signals are received over the loop circuit 12 from a remote station and are deciphered by the ciphering system.

Since the normal condition of the remote station in its idle or rest position is marking (current on the line conductors), the relay 71 will be energized over the previously described circuit including conductors 157 and 162. Thus, when code signals are received from the remote station, the start impulse will cause relay 71 to become de-energized. When this occurs, contact tongue 163 of receiving relay 71 is released and the following circuit is completed: From battery 35, through contact tongue 77 of relay 39, over conductor 164, through the winding of direction relay 37, over conductor 165, through contact tongue 163 of receiving relay 71 (now de-energized), over conductor 46, through the winding of start magnet 44 of the receiving distributor 45, over conductor 47, through the make-before- break contact 48 associated with relay 51, to ground. Therefore, at this time, the distributor 45 is released for a cycle of operation through the operation of start magnet 44 and the direction relay 37 is energized and becomes locked up over the following circuit after brush 55 passes off of segment 54 to cause the de-energization of relay 51: From battery 35, through tongue 77 of direction relay 39, over conductor 164, through the winding of direction relay 37, through contact tongue 172 (now attracted), over conductors 62 and 63, through tongue 57 of locking relay 51 and through make-before-break contact 48 to ground. The attraction of tongue 36 by the direction relay 37 breaks the possible operating circuit for direction relay 39 so that again it is apparent that the station which first seizes control of the system prevents the other station from operating during a signal code combination.

When direction relay 37 operates, contact tongue 173 associated therewith is attracted so that contact tongue 67 of transmitting relay 26 is short-circuited in order to suppress interference by this contact with the circuit at this time. This circuit is as follows: From ground, through contact tongue 173 of relay 37, over conductors 174 and 150, through contact tongue 67 to ground. It is thus obvious that when the contact tongue 67 operates inasmuch as it is directly grounded, it will not cause the repetition of signals at this time.

Operation of direction relay 37 further causes the attraction of its associated contact tongue 175, and ground for the storing relays is furnished over the following circuit: From battery 82 to a particular receiving relay 83, over one of the conductors 84 to 88, through its associated contact segment 89, over brushes 91, through the solid conducting ring 92, over conductor 93, through contact tongue 73 of relay 71, over conductor 74, through contact tongue 175 (now attracted) of direction relay 37, to ground.

Distributors 45 and 113 will act in the same manner as when signals were being sent out or transmitted, to now decipher the incoming signals to cause the deciphered signals to be repeated by the transmitting relay 26. It will be remembered that contact tongue 67 of transmitting relay 26 is now short-circuited and rendered ineffective for transmission. However, at this time, transmitting contact tongue 25 is conditioned for operation and may make and break the circuit to the local station unit 11 to enable the local printer to print the incoming signals in their original or deciphered condition. This circuit is as follows: From battery 18, through the winding of local receiving relay 22, over conductor 23, over conductor 24, through contact tongue 25 (when attracted) of transmitting relay 26, over conductor 27, over conductor 28, through upper contact 29 of switch 17, over conductor 31, through the local station unit 11, over conductor 32, through tongue 33 of switch 17, and over conductor 34, to ground. The circuit shown in Fig. 1 therefore provides a ciphering system in which messages may be either enciphered or deciphered dependent upon the direction of transmission.

Another form of the invention about to be described is shown in Fig. 2. The circuit shown in Fig. 2 resembles the circuit shown in Fig. 1. Particularly, in this form of the invention there is provided no overlap feature, and a double wound transmitting relay 205 is employed instead of a single wound transmitting relay 26.

The circuit for Fig. 2, therefore, will only be described with respect to the portions wherein it varies from the disclosure of Fig. 1.

In the modification, a distributor 201 and a distributor 202 are driven in synchronism upon the same rotary shaft, and at a speed suitable for the speed of transmission used. When start magnet 203 receives the start or no-current impulse at the commencement of transmission, the distributors are released for operation, and both brush arms now move together. Storing relays 204 will be conditioned in the manner described in connection with relays 83 of Fig. 1 to energize the left-hand winding of double wound transmitting relay 205 when marking conditions occur, over the following circuit: From battery 200, through the left-hand winding of relay 205, over conductor 206, through the conducting ring 207, over brush 209, through a particular segment 208, over a particular conductor 211 now conditioned, through a particular contact tongue 212 to ground. As a particular storing relay 204 becomes operative, it is locked up over the following circuit: From battery 199, over conductor 213, through the winding of a particular receiving relay 204, through contact tongue 215 now attracted, over conductor 216, and through contact tongue 217 (when released) of relay 218 to ground. In the rest position of the distributor 201, preceding each signal code combination, relay 218 is energized to attract its contact 217 and thus break any locking circuit which may have been previously established in the immediately preceding signal code combination. This circuit is as follows: From battery 210, through the winding of relay 218, over conductor 219, through segment 220 of distributor 201, over brush 209, through segment 221, to ground.

In synchronism with the operation of the storing relays 204 to control the left-hand winding of the double wound transmitting relay 205, key signals are furnished for control of the right-hand winding of said double wound transmitting relay through the instrumentality of a key tape 222. Prior to the transmission of signal code combinations under the control of the key tape transmitter during each cycle of operation, tape stepping magnet 223 is operated, to step the tape to a new position, over the following circuit: From battery 198, through the stepping magnet 223, through segment 224 of distributor 201, over the brushes 197 and through the segment 196 to ground.

The circuit for the right-hand winding of relay 205 is as follows: From battery, through the right-hand winding of relay 205, over conductor 227, through solid conducting ring 228 of distributor 202, over the particular segment 229 conditioned, over a conductor 231, through a tape feeler contact lever 232, through the lower or marking contact 195, and over the conductor 233 to ground. When signals are being transmitted to a remote station, transmitting contact tongue 234 is rendered effective as hereinbefore described in connection with contact tongue 67 of Fig. 1, and transmitting contact tongue 235 is rendered ineffective by the short circuit including conductors 327 and 366 and contact 364. On the other hand, when signals are being received from a remote station, contact tongue 234 is short-circuited and contact tongue 235 is rendered effective for transmission.

When opposite conditions exist in the windings of the double wound transmitting relay 205, that is, with one winding conditioned for marking signals and the other winding conditioned for spacing signals, the relay will become unbalanced and its transmitting tongues 234 and 235 attracted. In other words, the two windings of double wound relay 205 are wound reversely, and thus have the effect of neutralizing each other when current is present in both windings, so that a condition of current in both windings is the same as current in neither winding, and in both cases the armatures 234 and 235 will be released. On the other hand, current in one winding and no current in the other winding will have the effect of attracting both armatures 234 and 235, but only one armature will be effective for transmitting signals, since the circuit including the other armature will have been short-circuited. The circuit in Fig. 2 is in other respects similar to the circuit shown in Fig. 1, and it is therefore deemed unnecessary to describe again the circuit in detail.

Another form of the invention is shown in Fig. 3 which is similar to that shown in Fig. 2 except that instead of the employment of a single double wound transmitting relay, as relay 205, there are provided two separate transmitting relays 251 and 252 operable by the identical circuit shown in Fig. 2. In the drawings, conductor 356 is the same as conductor 150 of Fig. 1, and conductors 327, 366, and 328 are respectively the equivalent of conductors 27, 66, and 28 of Fig. 1.

Relay 251 is operable either by enciphered or original signals to control its transmitting contacts 253 and 254. When the local station unit 255 is transmitting enciphered signals over loop circuit 256 to a remote station, contact 253 is effective and contact 254 is shunted out of the circuit due to the operation of the direction sending relay 257 which attracts its contact tongue 364. On the other hand, when incoming signals are being received from the distant station contact 253 is short-circuited due to the closure of contact 258 upon the operation of the direction sending relay 259. At this time the direction relay 257 is unoperated and armature 364 is released to render transmitting contact 235 effective.

It has already been explained that the ciphering system herein employed is predicated upon the combination of key signals provided by a key tape with either original or enciphered signals. Under opposite operating conditions, that is, with one element of the code, provided by the key signals, marking, and a corresponding element of the code, provided by an enciphered or original signal, spacing, produces a marking condition of the signaling line. Like conditions, however, that is, with both elements of the code marking or both elements of the code spacing, produce spacing conditions of the signaling line. Referring again to the circuit shown in Fig. 3, it can be seen that according to the provision of key signals for the relay 252 contact tongue 261 will be operated, and it is apparent that ground may be carried over either conductor 262 or 263 to the contact tongue 253 of relay 251 when opposite conditions exist. As contact 253 moves back and forth, it makes and breaks the circuit to the remote station over the loop circuit 256 thereby to transmit enciphered signals to the remote station.

However, when incoming signals are received from the remote station over line 256, receiving relay 251 receives signals in their enciphered condition, and its associated contact 254 is adapted to cooperate with contact 264 to make and break the circuit to the local printer 255. At this time contact tongue 364 of direction relay 257 is open and consequently in this direction of transmission, conductors 327 and 366 do not provide a shunt circuit. Conductor 271 now receives battery through the winding of relay 272, over the conductor 271, through the conductor 366 providing battery for transmitting contact 264 which may be extended over either conductor 272 or 273. Therefore, contact tongues 254 and 264 will operate together to make and break the local circuit to the printer 255 according to signaling conditions.

In Figs. 4 and 5 are illustrated schematically a method of connecting intercommunicating stations, whereby a convenient way of reversing the loop circuit at said stations is provided. As previously described, the loop circuit of the system shown in Fig. 1 extends from ground, through contact 67, over conductor 150, through the winding of relay 71, over conductor 157, through switch 17, over line loop 12 to the distant station and returning again through the switch 17, and then over conductor 162 and through battery 149 to ground. It may be desirable to provide battery from the distant station, so, to accomplish this result the conductor 162 and the ground lead from contact 67 have been shown as connected to a connecter block 401. On any telegraph line, battery is usually supplied at one end of the line and ground at the other, and the installer has specifications which instruct him to strap certain terminals together. By means of the present invention, it is only necessary to show different strapping on the connector block to indicate the different types of circuit. In Fig. 5, the outlying stations are indicated as connected through an exchange 402.

It is to be understood that various changes and modifications may be made in the present invention without departing from the spirit and scope thereof.

What is claimed is:

1. In a telegraph system, a double wound relay, means to transmit to one winding of said relay start-stop permutation code signals, means to transmit to the other winding code signal elements only so that each of the corresponding code elements in the two signals occur at the same time, and means to generate signals controlled by the contacts of said relay.

2. In a ciphering system, two circuits, on one of which plain signals are always transmitted and in the other of which enciphered signals are always transmitted, a circuit adapted to encipher plain signals and to decipher enciphered signals, a first relay in one of said circuits, a second relay in the other circuit, a first contact in the first circuit, a second contact in the second circuit, means to operate both contacts according to the output of the ciphering device, means to control the input of the ciphering device according to the operation of either relay, and means to render one of the relays ineffective and one of the contacts ineffective according to which relay receives an initial signal.

3. In a repeater, means to transmit to said repeater signals comprising a start impulse and a plurality of variable code impulses, means to invariably repeat the start impulse unaltered, and means to modify the code impulses according to a prearranged plan.

4. In combination with a repeater, two line positions, a combination enciphering and deciphering circuit disposed between said positions, and automatic means in said circuit comprising a pair of relays, one responsive to an initial signal from one of said positions and the other responsive to an initial signal from the other of said positions to cause the circuit to act in an enciphering manner or a deciphering manner according to which relay receives the initial signal.

5. In a signaling system, a double wound relay. means to transmit to one winding start-stop permutation signals, means to transmit to the other winding similar permutation code signals only which have the reverse effect of signals in the first winding, and contacts operated by the relay to transmit start-stop signals in which only the code element of the signals are modified by the second winding.

6. In a ciphering system, means to generate signals including an invariable starting portion and a variable portion representing information, means to generate ciphering signals, having an invariable blank portion and a variable code portion, means to operate the two generating means in step so that corresponding elements of the two signals are simultaneous, and means controlled by the two simultaneous signals to generate a third modified signal in which corresponding elements are generated substantially simultaneously with the corresponding elements of the first and second mentioned signals.

7. In a ciphering system, means to generate start-stop permutation code signals representing information to be communicated, a regenerative repeater controlled by said signals, and ciphering means to determine the marking or spacing character of the code elements of the regenerated signals impulse by impulse as the corresponding impulses are received.

8. In a ciphering device, two transmitting distributors of start-stop permutation code signals, means to operate the two distributors in phase under control of said code signals, means to determine the character of the code impulses transmitted by one distributor according to information to be communicated, means to determine the character of the code impulses transmitted by the other distributor according to a prearranged plan, means to invariably repeat the start impulse unaltered, and means to generate enciphered signals under control of the two sets of signals.

9. In a ciphering system, a signaling circuit, a first station, a second station, transmitting and receiving telegraph apparatus at each station, a single ciphering key mechanism at each station associated with both the receiving and transmitting apparatus at that station, means to control the receiving apparatus at each station by the transmitting apparatus at the other station over said circuit, means to condition the key mechanism for enciphering or deciphering according to the direction of transmission, and automatic means comprising a pair of relays, one responsive to an initial signal from said first station and the other responsive to an initial signal from said second station, to alter the key mechanism conditioning means at intervals according to which relay receives the initial signal.

10. In a ciphering system, a first station, a second station, a circuit connecting said stations, means to transmit information in both directions over the circuit, a single variable key ciphering mechanism at each end of the circuit operable on signals in either direction and means comprising a pair of relays in each ciphering mechanism, one responsive to an initial signal from said first station and the other responsive to an initial signal from the second station, for automatically conditioning said mechanism for operation according to which relay receives the initial signal.

11. In a ciphering system, a first station, a second station, a circuit connecting said stations, means to transmit information in both directions over the circuit, a single variable key ciphering mechanism at each end of the circuit operable on signals in either direction, and automatic means comprising a pair of instrumentalities in each ciphering mechanism one responsive to an initial signal from said first station and the other responsive to an initial signal from said second station to alter the two key ciphering mechanisms variably at intervals according to which instrumentality receives the initial signal.

12. In a telegraph system, a first station, a second station, transmitting and receiving apparatus at each station, a ciphering key mechanism, and automatic means comprising a pair of instrumentalities in each mechanism, one conditioned in response to an initial signal from said first station and the other conditioned in response to an initial signal from said second station, to alter the key mechanism for each signal transmitted and each signal received according to which instrumentality is conditioned.

13. In a telegraph system, a signaling circuit, a first station, a second station, telegraph apparatus at each station, means to operate the apparatuses for communicating information in either direction over the circuit, a key mechanism at each station, a pair of instrumentalities in each mechanism, one conditioned in response to an initial signal from said first station and the other conditioned in response to an initial signal from said second station, and means to alter the two key mechanisms according to which instrumentality is conditioned so that said mechanisms are continuously in step between two consecutive signals independent of the direction of transmission of the signals.

14. In a telegraph system for enciphering and deciphering messages, a first station, a second station, a distributor at each station, a plurality of storing relays connected to said distributor, means for sensing a tape perforated according to a predetermined plan, contacts controlled by said means, means effective under the combined influence of said distributor and said sensing means to transmit resultant signals, and means comprising a pair of instrumentalities, one conditioned in response to an initial signal from said first station and the other conditioned in response to an initial signal from said second station, capable of being automatically conditioned according to which instrumentality is conditioned to effectuate the enciphering or deciphering of the said signals stored in said storing relays.

15. In a telegraph system for enciphering and deciphering messages, a first distributor, a second distributor, a third distributor, a plurality of storing relays connected to said first distributor, a corresponding plurality of contacts controlled by said storing relays and connected to said second distributor, means for sensing a tape perforated according to a predetermined plan, a plurality of contacts controlled by said means and connected to said third distributor, a double wound relay having one winding connected to said second distributor and the other winding connected to said third distributor, and transmitting contacts controlled by said double wound relay according to the combined influence of said second and third distributors to transmit resultant signals.

16. In a telegraph system for enciphering and deciphering messages, first, second, and third distributors, a plurality of storing relays connected to said first distributor, a corresponding plurality of contacts controlled by said storing relays and connected to said second distributor, means for sensing a key tape, a plurality of contacts controlled by said means and connected to said third distributor, a double wound relay having one winding connected to said second distributor and the other winding connected to said third distributor, transmitting contacts controlled by said double wound relay according to the combined influence of said second and third distributors to transmit resultant signals, and means capable of being automatically conditioned to encipher or decipher said signals according to the direction of transmission.

17. In a telegraph system, two stations, a communication circuit connecting the said two stations, telegraph transmitting and receiving apparatus at each station, ciphering apparatus associated with each station, and automatic means comprising a pair of relays, one conditioned in response to an initial signal from one of said two stations and the other conditioned in response to an initial signal from the other of said two stations, to cause the ciphering apparatus to act in an enciphering manner or a deciphering manner according to which relay receives the initial signal.

18. In a telegraph system, two stations, a communication circuit connecting said two stations, telegraph transmitting and recording apparatus at each station, two sets of siphering apparatus intermediate the two transmitting and recording apparatuses, and automatic means comprising a pair of relays, one conditioned in response to an initial signal from one of said two stations and the other conditioned in response to an initial signal from the other of said two stations, to cause each ciphering apparatus to operate in an enciphering manner or deciphering manner according to which relay receives the initial signal.

LOUIS M. POTTS.